US012712457B2

(12) United States Patent
Wang et al.

(10) Patent No.: US 12,712,457 B2

(45) Date of Patent: Aug. 18, 2026

(54) COMPENSATING COUPLING TRANSFORMERS FOR TRANS-INDUCTOR VOLTAGE REGULATORS

(71) Applicant: NVIDIA CORPORATION, Santa Clara, CA (US)

(72) Inventors: Shuai Wang, Shenzhen (CN); Huashi Li, Shenzhen (CN); Jie Zhou, Shenzhen (CN)

(73) Assignee: NVIDIA CORPORATION, Santa Clara, CA (US)

( * ) Notice: Subject to any disclaimer, the term of this patent is extended or adjusted under 35 U.S.C. 154(b) by 318 days.

(21) Appl. No.: 18/698,275

(22) PCT Filed: Oct. 30, 2023

(86) PCT No.: PCT/CN2023/127639

§ 371 (c)(1),
(2) Date: Apr. 3, 2024

(87) PCT Pub. No.: WO2025/091149

PCT Pub. Date: May 8, 2025

(65) Prior Publication Data

US 2026/0155749 A1 Jun. 4, 2026

(51) Int. Cl.
*H02M 3/335* (2006.01)
*H02M 1/44* (2007.01)

(52) U.S. Cl.
CPC .............. *H02M 3/335* (2013.01); *H02M 1/44* (2013.01)

(58) Field of Classification Search
CPC ................................ H02M 3/335; H02M 1/44
See application file for complete search history.

(56) References Cited

U.S. PATENT DOCUMENTS

2004/0257272 A1 12/2004 Jacobson
2021/0273574 A1 9/2021 Zheng et al.
2022/0216793 A1 7/2022 Shao et al.
2022/0376600 A1* 11/2022 Jong .................. H02M 3/1582
2023/0318430 A1* 10/2023 Chen .................. H02M 3/1586 323/271
2023/0402931 A1* 12/2023 Luo .......................... G05F 1/32
2024/0120847 A1* 4/2024 Jiang ................. H02M 3/33571
2024/0128870 A1* 4/2024 D'Souza ............ H02M 3/1588
2024/0266104 A1* 8/2024 Zhang ..................... H01F 27/38
(Continued)

FOREIGN PATENT DOCUMENTS

CN 116155128 A 5/2023

OTHER PUBLICATIONS

International Search Report for Application No. PCT/CN2023/127639 dated Jul. 24, 2024.

*Primary Examiner* — Sisay G Tiku
(74) *Attorney, Agent, or Firm* — Artegis Law Group, LLP

(57) ABSTRACT

Various embodiments disclose a trans-inductor voltage regulator comprising a first group pairing of switching circuits that includes, a first group of switching circuits, a first compensating coupling inductor coupled to the first group of switching circuits, a second group of switching circuits, and a second compensating coupling inductor coupled to the second group of switching circuits, where the first compensating coupling inductor comprises a first winding of a compensating coupling transformer, and the second compensating coupling inductor is a second winding of the compensating coupling transformer.

20 Claims, 12 Drawing Sheets

(56) References Cited

U.S. PATENT DOCUMENTS

| | | | | |
|---|---|---|---|---|
| 2025/0219528 | A1* | 7/2025 | Aden | H02M 5/293 |
| 2025/0239936 | A1* | 7/2025 | Niu | H02M 1/0043 |
| 2025/0274028 | A1* | 8/2025 | Jiang | H02M 3/003 |
| 2025/0337324 | A1* | 10/2025 | Huang | H01F 27/30 |

* cited by examiner

COMPENSATING COUPLING TRANSFORMERS FOR TRANS-INDUCTOR VOLTAGE REGULATORS

CROSS-REFERENCE TO RELATED APPLICATIONS

The present application is a national stage application of the international application titled, "COMPENSATING COUPLING TRANSFORMERS FOR TRANS-INDUCTOR VOLTAGE REGULATORS," filed on Oct. 30, 2023, and having application number PCT/CN2023/127639. The subject matter of this related application is hereby incorporated herein by reference.

BACKGROUND

Field of the Various Embodiments

The various embodiments relate generally to computer systems and electrical circuits and, more specifically, to compensating coupling transformers for trans-inductor voltage regulators.

Description of the Related Art

Computer devices and systems typically include various electrical circuits to regulate the power delivered to the different electronic components within those devices and systems during operation. For example, many computer devices include multiple power control circuits, such as voltage regulators, that control a power supplied by a power source by outputting a specific voltage to power one or more electrical components. High-performance computer devices and systems, such as server machines, desktops, laptops, motherboards, and graphical processing units (GPUs), usually include electronic components that consume large amounts of power and therefore require a high, steady input power. To meet such requirements, designers can include voltage regulators within a computer device or system to output high levels of power using high input currents and high slew rates. One type of voltage regulator used for this purpose is a trans-inductor voltage regulator (TLVR), which is a switching circuit that provides high current and dynamic responses during transitions, thereby enabling electronic components within a computer device or system to receive a high, steady power from a power source. TLVRs also reduce the required output capacitance of the circuit that provides the input current to the electronic components, which, in turn, reduces the form factor of the capacitors in the circuit as well as the overall footprint of the circuit within the computer device or system.

Generally speaking, a TLVR is a type of multiphase voltage regulator that includes multiple converters that each produce a target output voltage, where each converter includes a transformer. The secondary windings of transformers in the respective converters are connected to form a circuit. Because the secondary windings are connected, a given converter controls the current flowing through the secondary windings of other converters, even when the other converters are not actively inducing current. As a result, the output current produced by the circuit of secondary windings ramps up or down in all phases, thereby enabling the TLVR to respond to load transients. In some cases, a TLVR can include additional windings and inductors to help control the amount of current ripple experienced when transitioning between phases.

At least one drawback with conventional TLVRs is that improvements to the topology of the TLVR circuit are difficult to implement. For example, designers may add a compensating inductor to the series of secondary windings of the TLVR to adjust the inductance. However, the inclusion of the compensating inductor leads to the TLVR producing a current ripple, with the inclusion of smaller compensating inductors resulting in larger output current ripple and lower output steady state efficiency. Attempts to further improve TLVRs that include the compensating inductor have led to further drawbacks. For example, when modifying a TLVR and compensating inductor to improve the transient response performance when transitioning to a steady state, designers attempt to increase a coupling coefficient between the windings of the transformers included in the respective converters, and decrease the self-inductance of the compensating inductor, which negatively affects the steady state efficiency of the TLVR. By contrast, when modifying a TLVR and compensating inductor to improve the steady state efficiency, designers attempt to decrease the coupling coefficient between the windings of the transformers included in the buck converters, and increase the self-inductance of the compensating inductor, which negatively affects the transient response performance of the TLVR.

As the foregoing illustrates, what is needed in the art are more effective designs for voltage regulators that are used in computer devices and systems.

SUMMARY

Various embodiments disclose a trans-inductor voltage regulator comprising a first group pairing of switching circuits that includes, a first group of switching circuits, a first compensating coupling inductor coupled to the first group of switching circuits, a second group of switching circuits, and a second compensating coupling inductor coupled to the second group of switching circuits, where the first compensating coupling inductor comprises a first winding of a compensating coupling transformer, and the second compensating coupling inductor is a second winding of the compensating coupling transformer.

Various embodiments also disclose a system that includes a first processor and the trans-inductor voltage regulator that generates a first voltage to the first processor.

At least one technical advantage of the disclosed design for a multiphase TLVR relative to the prior art is that with the disclosed design, computer devices and systems can provide power to electronic components more efficiently and at lower costs. For example, when operating in the steady state, the compensating coupling transformer included in the disclosed design enables a multiphase TLVR to produce output power using smaller current ripple with lower losses than what can be achieved using conventional multiphase TLVRs. When operating in dynamic load states, such as step-up or step-down transitions, the compensating coupling transformer included in the disclosed design causes a multiphase TLVR to produce a smaller transient output and recover in a shorter amount of time, thereby reducing the output capacitance relative to what is experienced with conventional multiphase TLVRs. Further, because the compensating coupling transformer included in the disclosed design occupies a smaller area on a circuit board than the two separate inductors included in conventional designs, the disclosed design enables a given printed circuit board to include a greater density of multiphase TLVRs relative to what can be achieved using conventional designs. Thus, the disclosed design improves the overall ability to control power use in high-performance computer devices and systems and when executing high-performance applications. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1A:
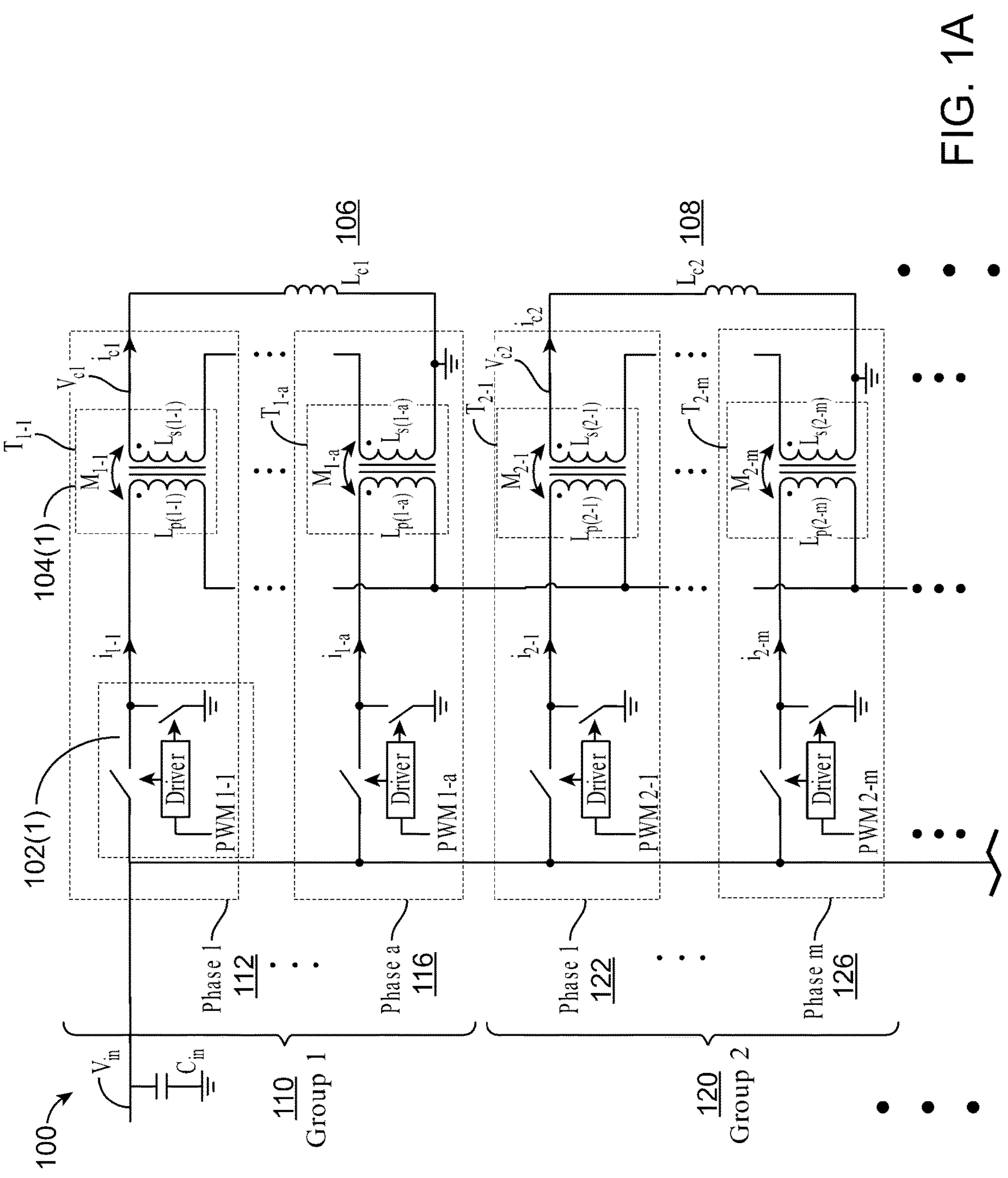
FIG. 1A illustrates a circuit diagram of a multiphase trans-inductor voltage regulator (TLVR) that can be used to power a high-performance electronic component, according to one or more aspects of the present disclosure.
Figure 1A:
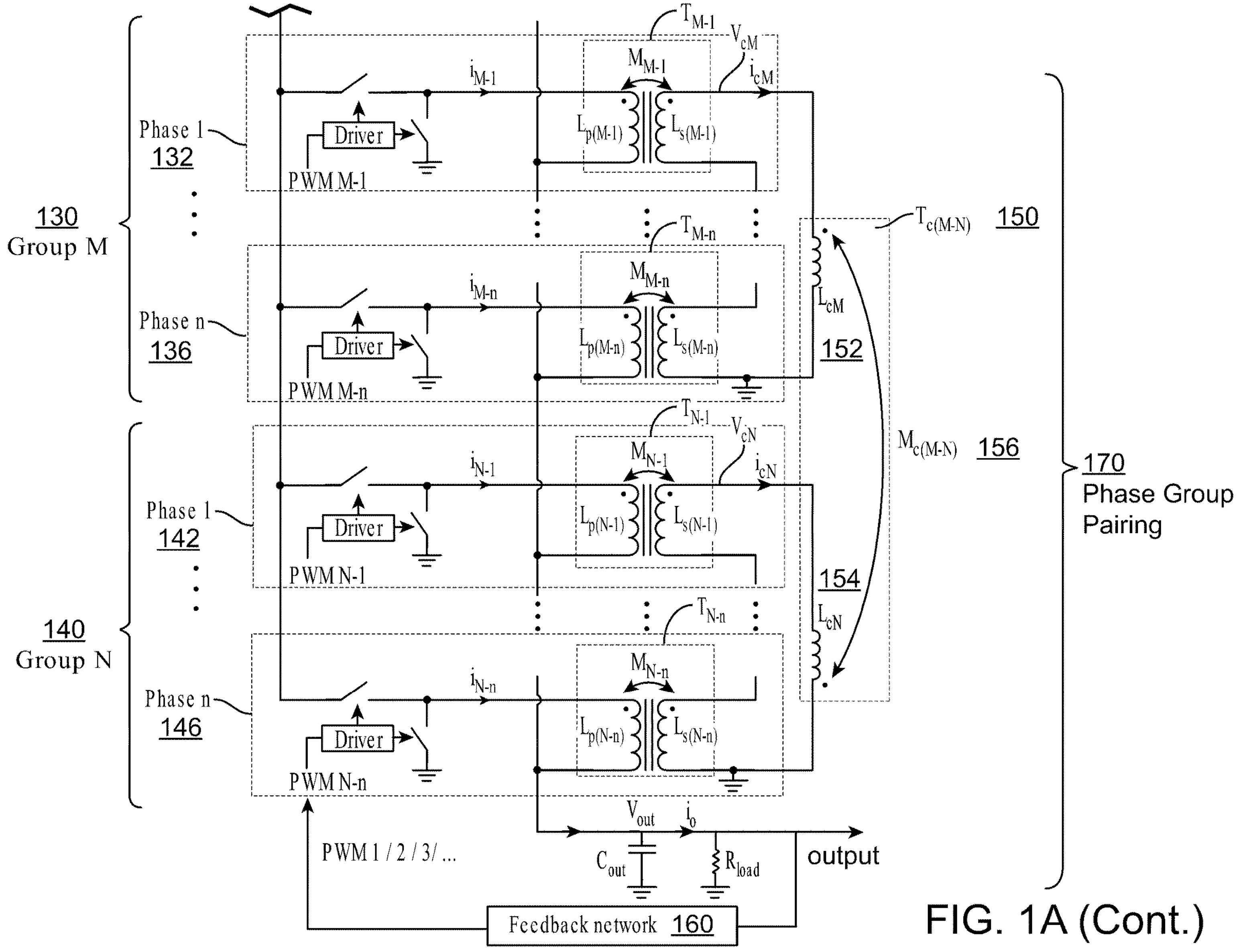

FIG. 1A illustrates a circuit diagram of a multiphase trans-inductor voltage regulator (TLVR) 100 that can be used to power a high-performance electronic component, according to one or more aspects of the present disclosure. As shown, and without limitation, the TLVR 100 includes a phase group 1 110, a phase group 2 120, a feedback network 160, and a phase group pairing 170 including a phase group M 130, a phase group N 140, and a compensating coupling transformer 150. Each phase group includes two or more phase converters (e.g., phase 1 converter 112, phase a converter 116, etc.). Each phase converter includes a switching network 102 (e.g., the switching network 102(1), etc.), and a coupling transformer 104 (e.g., 104(1), etc.). The phase group 1 110 includes a compensating inductor 106 and the phase group 2 120 includes a compensating inductor 108. The compensating coupling transformer 150 includes, without limitation, the compensating coupling inductors 152, 154.

The multiphase TLVR 100 is configured to receive an input voltage $V_{in}$ and provide an output voltage $V_{out}$ to a load. In the illustrated example of FIG. 1, the load is represented as a resistive load $R_{load}$ that consumes an output current $i_0$. In some examples, the load is an electronic component, such as a processor, a memory, a semiconductor, such as a central processing unit (CPU), a graphics processing unit (GPU), a high-current application-specific integrated circuit (ASIC), and/or a field programmable gate array (FPGA), incorporated in a computer device or system. As persons skilled in the art will appreciate, a computing device or system that includes the load powered by the multiphase TLVR 100 can be any type of technically feasible computer system, including, without limitation, a server machine, a server platform, a desktop machine, a laptop machine, a hand-held/mobile device, or a wearable device. Furthermore, persons skilled in the art will understand that the multiphase TLVR 100 can also be used to power other types of components.

The multiphase TLVR 100 includes multiple phase groups (e.g., the phase group 1 110, the phase group 2, 120, the phase group M 130, the phase group N 140, etc.), that include a plurality of phase converters. Each phase converter included in the plurality of phase converters respectively includes a switching network 102 that generates a phase of the output voltage $V_{out}$ by driving a separate coupling transformer 104. For example, the multiphase TLVR 100 includes the phase group 1 110 that includes the phase 1 converter 112 through the phase a converter 116. The switching network 102(1) of the phase 1 converter 112 generates a first phase of output current as $i_{1-1}$, corresponding to the first phase of the output voltage. Similarly, the switching network of the phase a converter 116 generates an a-th phase of the output current as $i_{1-a}$, the switch network of the phase n converter in the group N 140 146 generates a phase current $i_{N-n}$, etc.

Each switching network 102 (e.g., 102(1), etc.) of the respective phase converters includes a plurality of switches and a driver. The driver controls operation of each switch in the plurality of switches in accordance with control signals, such as a pulse width modulation (PWM) control signal (e.g., PWM 1-1, etc.) generated by the feedback network 160. When a switch that is coupling the coupling transformer 104 to the input voltage $V_{in}$ is turned ON, or closed, the switching network 102 is coupled to the input voltage $V_{in}$ such that the switching network 102 causes the coupling inductor 104 to generate a phase voltage $V_p$ at the secondary winding of the phase converter. When the switch is turned OFF, or is open, the switching network 102 is disconnected from the input voltage $V_{in}$ and the phase voltage is not generated at the secondary winding of the phase converter. When the other switch is turned ON, the switching network 102 is coupled to ground, and when turned OFF, the switching network 102 is disconnected from ground. In the illustrated example of FIG. 1, each switching network 102 includes two switches and one driver. However, in some embodiments, each switching network 102 includes a different number of switches and/or drivers.

As will be described in more detail herein, in operation, the feedback network 160 generates one or more control signals for controlling operation of the switching networks 102 based on measurements indicative of and/or associated with voltages and/or currents flowing through the multiphase TLVR 100. For example, the feedback network 160 can generate one or more PWM signals based on measurements indicative of and/or associated with currents flowing through the multiphase TLVR 100. In operation, the feedback network 160 applies the one or more control signals (e.g., PWM signals 1-1, 1-a, 2-1, etc.) to the drivers included in the switching networks 102 to control the frequency and/or the duty cycle at which the switches included in the switching networks 102 are turned ON and OFF. The feedback network 160 can be implemented as any suitable control device and/or circuit for controlling operation of switching networks 102. For example, the feedback network 160 can be implemented as one or more of an analog control circuit, a digital control circuit, a microprocessor, an integrated circuit, and/or any other suitable control device for controlling operation of the switching networks 102. As another example, the feedback network 160 can implemented as a PWM controller that controls the PWM signals based on the output voltage and/or the output current.

Each coupling transformer T 104 included in the phase converters includes a primary winding $L_p$ and a secondary winding $L_s$. The primary winding (e.g., $L_{p(1\text{-}1)}$, etc.) of the coupling transformer T 104 is coupled to the output of a respective switching network 102 such that the phase current i generated by the respective switching network 102 flows through the primary winding of the coupling transformer 104. For example, the primary winding $L_{p(1\text{-}1)}$ included in the coupling transformer $T_{1\text{-}1}$ 104(1) for the phase 1 converter 112 is coupled to the output of the switching network 102(1) that the first phase current $i_{1\text{-}1}$ generated by the switching network 102(1) flows through the primary winding $L_{p(1\text{-}1)}$ of the coupling transformer $T_{1\text{-}1}$ 104(1). Similarly, the primary winding $L_{p(1\text{-}a)}$ included in the coupling transformer $T_{1\text{-}a}$ for the a-th phase converter 116 is coupled to the output of the switching network 102 for the a-th phase such that the a-th phase current $i_{1\text{-}a}$ generated by the switching network 102 flows through the primary winding $L_{p(1\text{-}a)}$ of the a-th phase coupling transformer $T_{1\text{-}a}$ 104, and so forth. Each coupling transformer 104 further includes a secondary winding $L_s$. As shown in FIG. 1, the secondary windings $L_s$ of the plurality of coupling transformers 104 in a given group (e.g., $L_{s(M\text{-}1)}$ through $L_{s(M\text{-}n)}$) are coupled in series with each other. For example, the secondary winding $L_{s(1\text{-}1)}$ of the coupling transformer 104(1) for the phase 1 converter 112 is coupled in series with the secondary winding $L_{s(1\text{-}a)}$ of the coupling transformer 104 for the a-th phase converter 116. The mutual inductance M of each transformer represents an additional inductance in the circuit in addition to the self-inductances L of each inductor included in the transformer T. For example, the coupling transformer $T_{1\text{-}1}$ 104(1) included in the phase 1 converter 112 includes a mutual inductance $M_{1\text{-}1}$ in addition to the self-inductance $L_{p(1\text{-}1)}$ for the first winding and the self-inductance $L_{s(1\text{-}1)}$ for the second winding. In some embodiments, the mutual inductance M can be modeled as one or more separate inductors (not shown) that are coupled with the windings of the transformer.

In various embodiments, the multiphase TLVR 100 includes one or more phase groups (e.g., the phase group 1 110 and the phase group 2 120) that include a compensating inductor (e.g., 106, 108, etc.) that has an inductance of $L_c$ and is coupled in series to the secondary windings of the phase group. For example, the compensating inductor $L_{c1}$ 106 is coupled in series with the secondary windings of each transformer in the phase group 1 110. Thus, the current $i_{c1}$ that flows through compensating inductor 106 is the same current that flows through the secondary windings of the coupling transformers 104 included in the phase group 1 110. Alternatively, in some embodiments, the multiphase TLVR 100 includes only phase groups that include compensating coupling inductors (e.g., 152, 154) that are components of a compensating coupling inductor 150.

In various embodiments, the phase compensating inductor is separate from the compensating inductor 108. Further, the phase group M 130 and the phase group N 140 include the single compensating coupling transformer 150. As a result, the phase group pairing 170 formed by the phase group M 130 and the phase group N 140 occupies a reduced footprint compared to the phase groups 110, 120, as the compensating coupling transformer 150 occupies a smaller area on a printed circuit board than the separate compensating inductors 106, 108. As a result, the phase group pairing 170 saves more PCB area, has higher power density, and reduces PCB cost when compared to the phase groups 110, 120.

In various embodiments, the multiphase TLVR 100 further includes one or more phase group pairings (e.g., the phase group pairing 170 between two phase groups). For example, the phase group M 130 is paired with the phase group N 140 by the compensating coupling transformer $T_{c(M\text{-}N)}$ 150 to form the phase group pairing 170. In such instances, each phase group in the phase group pairing 170 includes a compensating coupling inductor (e.g., 152, 154) that is included in the compensating coupling transformer 150. The compensating coupling inductor has a self-inductance of $L_c$ and is coupled in series to the secondary windings $L_s$ of the coupling transformers 104 included in the phase group. For example, the compensating coupling inductor $L_{cM}$ 152 is coupled in series to the secondary windings $L_{s(M\text{-}1)}$ through $L_{s(M\text{-}n)}$ included in the phase group M 130. Similarly, the compensating coupling inductor $L_{cN}$ 154 is coupled to the secondary windings $L_{s(N\text{-}1)}$ through $L_{s(N\text{-}n)}$ included in the phase group N 140. In various embodiments, the phase groups 130, 140 included in the phase group pairing 170 include the same number of phases. For example, the phase group M 130 includes the same quantity of n phases as the phase group N 140.

In various embodiments, the compensating coupling transformer 150 has a mutual inductance $M_{c(M\text{-}N)}$ 156 that is based on the coupling between the compensating coupling inductors 152, 154. In some embodiments, the compensating coupling inductor 152 is negatively coupled to the compensating coupling inductor 154. In such instances, the mutual inductance 156 of the compensating coupling transformer 150 is based on the negative coupling. As will be discussed in further detail below, the negative coupling between the circuit formed by the compensating coupling inductor 152 and the secondary windings of the phase group M 130 and the circuit formed by the compensating coupling inductor 154 and the secondary windings of the phase group N 140 reduces the phase current ripple produced by the phase group pairing 170 while improving transient response performance when transitioning from a steady state.

Figure 1B:
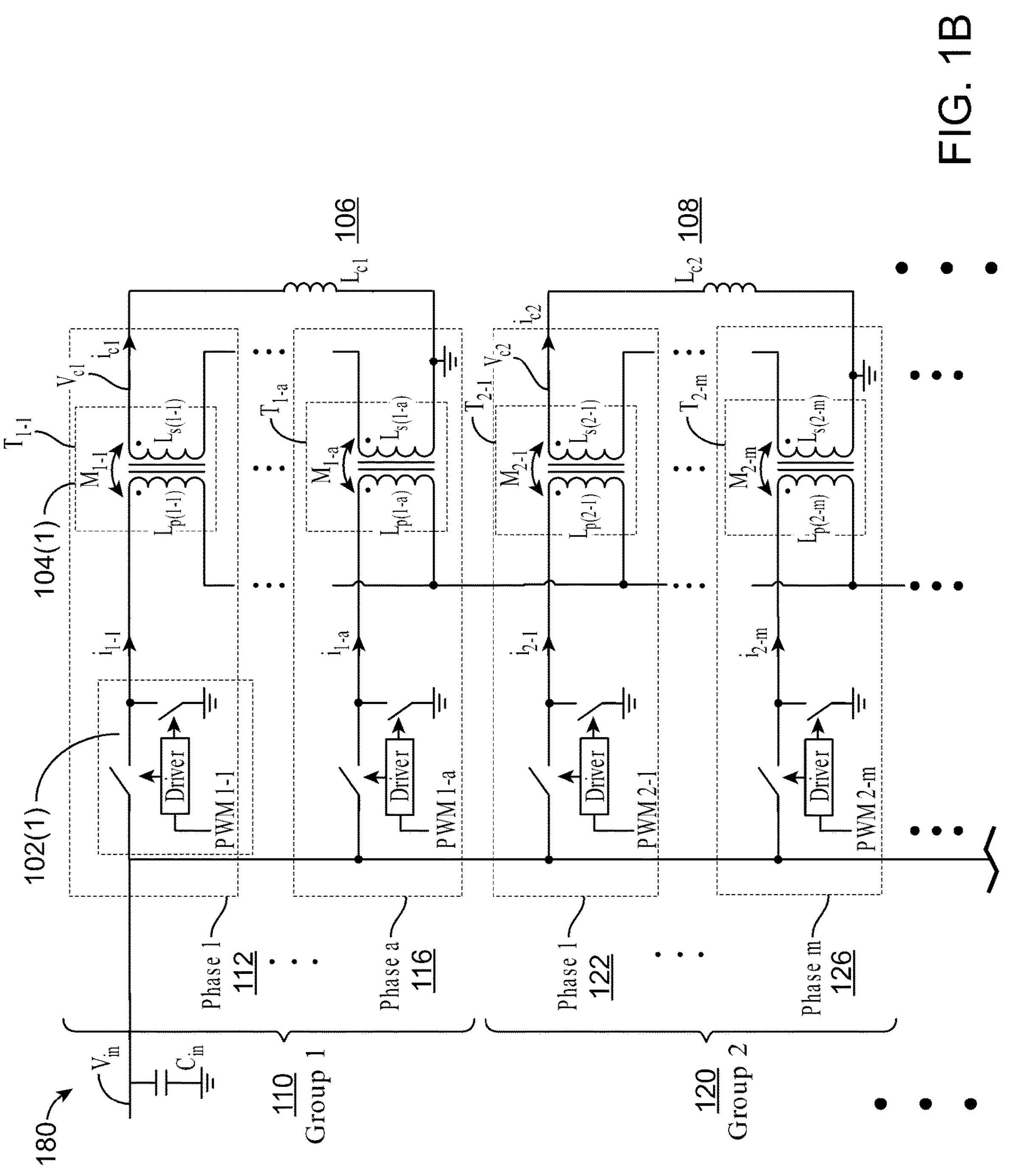
FIG. 1B illustrates a circuit diagram of another multiphase trans-inductor voltage regulator (TLVR) that can be used to power a high-performance electronic component, according to one or more aspects of the present disclosure.
Figure 1B:
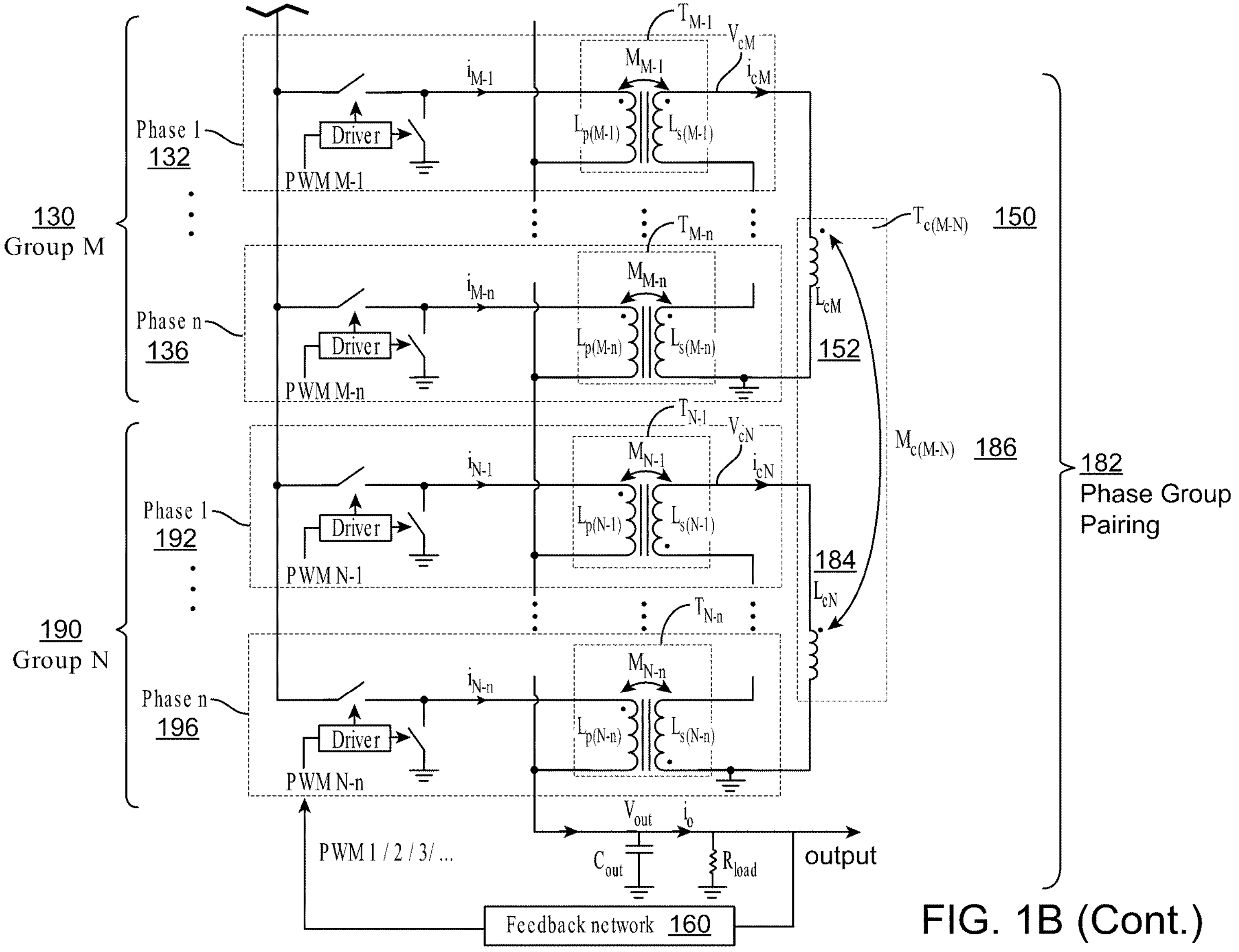

FIG. 1B illustrates a circuit diagram of another multiphase trans-inductor voltage regulator (TLVR) 180 that can be used to power a high-performance electronic component, according to one or more aspects of the present disclosure. As shown, and without limitation, the TLVR 180 includes the phase group 1 110, the phase group 2 120, the feedback network 160, and a phase group pairing 182. The phase group pairing 180 includes the phase group M 130, a phase group N 190, and a compensating coupling transformer 186. The compensating coupling transformer 182 includes, without limitation, the compensating coupling inductors 152, 184.

The multiphase TLVR 180 is similar to the multiphase TLVR 100. The phase group N 190 of the multiphase TLVR 180 differs from the phase group N 140 of the multiphase TLVR 100, as the secondary windings of the coupling inductors 104 in the phase converters 192, 196 are negatively coupled to the primary windings of the coupling inductors 104. Further, the compensating coupling transformer 150 of the phase group pairing 182 includes the compensating coupling inductor 184 that is positively coupled with the compensating coupling inductor 152, resulting in a mutual inductance $M_{c(M-N)}$ 186 that is based on the series of the compensating coupling inductor 184 and the secondary windings of the phase group N 190. As will be discussed in further detail below, the coupling between the circuit formed by the compensating coupling inductor 152 and the secondary windings of the phase group M 130 and the circuit formed by the compensating coupling inductor 184 and the secondary windings of the phase group N 190 reduces the phase current ripple produced by the phase group pairing 182 while improving transient response performance when transitioning from a steady state.

Figure 2:
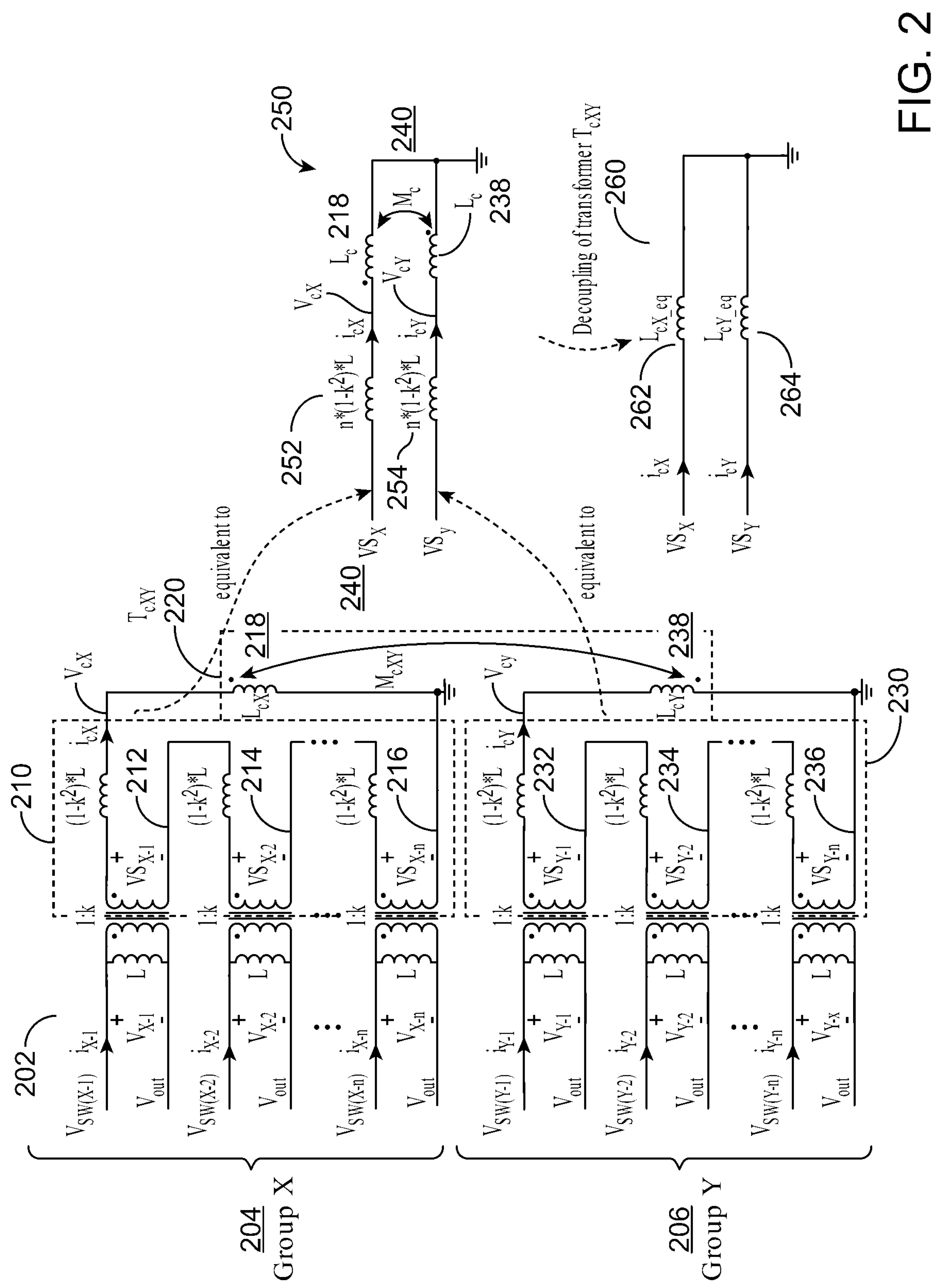
FIG. 2 illustrates a phase group pairing of phase converters included in a multiphase TLVR, as well as equivalent circuits of the phase group pairing, according to one or more aspects of the present disclosure.

FIG. 2 illustrates a phase group pairing 202 of phase converters included in a multiphase TLVR, as well as equivalent circuits 250, 260 of the phase group pairing 202, according to one or more aspects of the present disclosure. As shown, FIG. 2 illustrates a phase group pairing 202 of a multiphase TLVR circuit operating in a steady state, a circuit 250 that includes equivalent inductances for a portion of the phase group pairing 202, and a circuit 260 that includes equivalent inductances of the phase group pairing 202 based on decoupling the compensating coupling inductors 218, 238 included in the compensating coupling transformer 220. The phase group pairing 202 includes, without limitation, a phase group X 204 and a phase group Y 206. The phase group X 204 includes without limitation, a circuit 210. The phase group Y 206 includes without limitation, a circuit 230.

In operation, the respective series 210, 230 of inductors formed by secondary sides of the coupling transformers 104 and a compensating coupling inductor 218, 238 included in the compensating coupling transformer 220 has an equivalent inductance that is larger than is otherwise achieved when the compensating inductors are not coupled to each other in a steady state. As a result, the phase group pairing 202 using the compensating coupling transformer 220 reduces the current ripple of the output voltage and increases the efficiency of generating the output voltage.

The phase group pairing 202 of the multiphase TLVR includes a first series 210 that includes a series of secondary windings of coupling transformers 104 included in a phase group X 204. The first series 210 is coupled to a first compensating coupling inductor 218. The phase group pairing 202 of the multiphase TLVR also includes a second series 230 of secondary windings of coupling transformers 104 included in a phase group Y 206 that is coupled to a second compensating coupling inductor 238. The compensating coupling inductors $L_{cX}$ 218, $L_{cY}$ 238 are windings of a compensating coupling transformer $T_{cXY}$ 220. As shown, the compensating coupling inductors 218, 238 are negatively coupled to each other, having a mutual inductance of $M_{cXY}$ 240.

In various embodiments, the circuit 250 represents an equivalent circuit to circuits formed by the first series 210, the second series 230, and the compensating coupling transformer 220. For example, when the coupling transformers 104 of each phase converter have the same parameters (e.g., same self-inductances L, same coupling coefficients k, a turn ratio of 1:1, etc.), the coupled inductance model can be replaced by a transformer model, and the secondary windings can be combined and represented by an equivalent inductor. For example, the coupling inductors in the series 210, 230 and or the compensating coupling inductors 218, 238 in the compensating coupling transformer 220 can have substantially similar inductances in a range of 350-450 nH and substantially similar coupling coefficients in a range of 0.4-0.6. The circuit 250 includes a first series that includes a first equivalent inductor 252 having an inductance equivalent to the series of inductors 212, 214, 216 included in the first series 210. The circuit 250 includes a second series coupled to the first series, where the second series includes a second equivalent inductor 254 having an inductance equivalent to the series of inductors 232, 234, 236 included in the second series 230.

For the circuit 250, the voltage across each series can be computed from the inductances of the equivalent inductors 252, 254, the self-inductances of the compensating coupling inductors 218, 238, and the mutual inductance 240 of the compensating coupling transformer 220:

$$VS_X = n(1-k^2)L\frac{di_{cX}}{dt} + L_{cX}\frac{di_{cX}}{dt} - M_{cXY}\frac{di_{cY}}{dt} \quad \text{Equation 1}$$

$$VS_Y = n(1-k^2)L\frac{di_{cY}}{dt} + L_{cY}\frac{di_{cY}}{dt} - M_{cXY}\frac{di_{cX}}{dt} \quad \text{Equation 2}$$

The circuit 260 represents an equivalent circuit to the circuit 250 upon accounting for the mutual inductance 240 of the compensating coupling transformer 220. In such instances, the compensating coupling inductors 218, 238 of the compensating coupling transformer 220 are decoupled and the mutual inductance 240 is represented by a separate inductor in each series (not shown). The circuit 260 includes a third equivalent inductor 262 having an inductance $L_{cX\_eq}$ equivalent to the first equivalent inductor 252, the compensating coupling inductor 218, and an inductor representing the mutual inductance 240 of the compensating coupling transformer 220. The circuit 260 also includes a fourth equivalent inductor 264 having an inductance $L_{cY\_eq}$ equivalent to the second equivalent inductor 254, the compensating coupling inductor 238, and an inductor representing the mutual inductance 240 of the compensating coupling transformer 220.

As shown, the coupling coefficient $k_e$ associated with the first and second equivalent inductors 252, 254 is based on the first and second equivalent inductors and the compensating coupling inductors 218, 238. For example, when the compensating coupling inductors 218, 238 are equivalent (e.g., same self-inductance $L_c$), with a mutual inductance of $M_c$ and a turn ratio of 1:1, the coupling coefficient is:

$$k_e = \frac{n(1-k^2)L}{L_c} \quad \text{Equation 4}$$

Similarly, the coupling coefficient $k_c$ for the compensating coupling transformer 220 is based on the mutual inductance 240 of the compensating coupling transformer 220 and the self-inductance of the compensating coupling inductors 218, 238:

$$k_c = \frac{M_c}{L_c} \quad \text{Equation 4}$$

Based on the voltages derived in Equations 1-2 and the coupling coefficients derived in Equations 3-4, the equivalent inductance for each series in the equivalent circuits 250, 260 can be derived as a function of the voltages:

$$\left[(k_e+1)^2 - k_c^2\right]L_c\frac{di_{cY}}{dt} = (k_e+1)\times VS_Y + k_c \times VS_X \quad \text{Equation 5}$$

$$\left[(k_e+1)^2 - k_c^2\right]L_c\frac{di_{cX}}{dt} = (k_e+1)\times VS_X + k_c \times VS_Y \quad \text{Equation 6}$$

As will be discussed further in relation to FIGS. 3-4, the inductances for the third equivalent inductor 262 and/or the fourth equivalent inductor 264 can be determined for each steady state phase.

Figure 3:
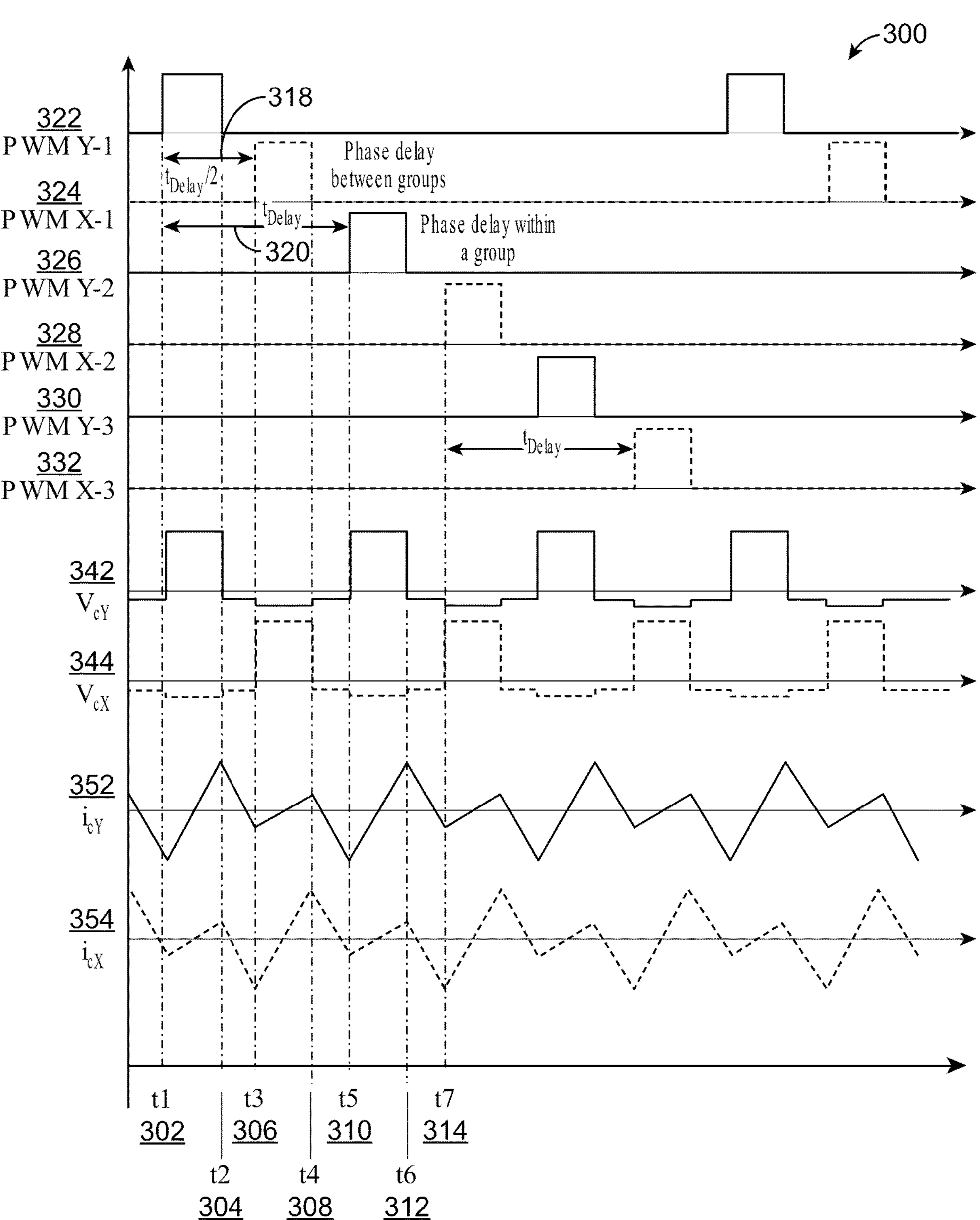
FIG. 3 illustrates waveforms of various components of the phase group pairing of FIG. 2 during operation of one or more switching networks, according to one or more aspects of the present disclosure.

FIG. 3 illustrates waveforms 300 of various components of the phase group pairing 202 of FIG. 2 during operation of one or more switching networks, according to one or more aspects of the present disclosure. As shown, FIG. 3 illustrates waveforms 300 that include the pulse width modulation pulses for phases M-1 through M-3 over one or more periods, with a delay 320 between each pulse. The PWM Y-1 322 produces a pulse for the phase Y-1, the PWM Y-2 326 produces a pulse for the phase Y-2, and the PWM Y-3 330 produces a pulse for the phase X-3. Similarly, the waveforms 300 include pulse width modulation pulses for X-1 through X-2 with the delay 320 between each pulse. In various embodiments, the delay 318 between a Y pulse and a X is equivalent to the half the delay 320 between PWM pulses in the same group. The waveforms 300 further include the equivalent voltages and currents for the circuit 250, including the voltage $V_{cX}$ 344 and current $i_{cX}$ 354 along the first series, and the voltage $V_{cY}$ 342 and current $i_{cY}$ 352 along the second series.

In operation, a phase group pairing 202 enters the steady state at various times based on control signals. In various embodiments, the feedback network 160 generates PWM pulses 322-332 to control the switches included in the respective switching networks 102. For example, the driver included in that phase group pairing 202 receives the PWM pulse 322 and causes the phase group pairing 202 to operate in a first steady state during the periods between $t_1$ 302 and $t_2$ 304, $t_3$ 306 and $t_4$ 308, and $t_5$ 310 and $t_6$ 312, where only the PWM pulse is high and all other PWM pulses 324-332 are low. Alternatively, in some embodiments, the duty cycle of the PWM pulses 322-332 are longer. In such instances, two or more PWM pulses 322-332 overlap and operate in a different steady state. In other examples, all PWM pulses are low. For example, the phase group pairing 202 can operate in a second steady state at periods between $t_2$ 304 and $t_3$ 306, between $t_4$ 308 and $t_5$ 310, and between $t_6$ 312 and $t_7$ 314. During these periods, all PWM pulses 322-332 are low.

When operating in the first steady state, the voltages across each series in the circuits 250, 260 can be derived from the input voltage and output voltage. For example, for the phase group X 204 and the phase group Y 206 in the phase group pairing 202, each phase group includes 3 PWMs and 1 PWM drives m phases, resulting in a total of n phases. In this example, 1 PWM pulse drives a switching network 102 in the Y phase group (e.g., the PWM pulse 322 for the period between $t_1$ 302 and $t_2$ 304; the PWM pulse 326 for the period between $t_5$ 310 and $t_6$ 312). In such instances, the voltage along each series in the circuit 250 during periods is:

$$VS_X = -knV_{out} \quad \text{Equation 7}$$

$$VS_Y = k(mV_{in} - nV_{out}) \quad \text{Equation 8}$$

Based on these computed voltages, the equivalent inductance for the circuit 260 can be derived for the first steady state:

Equation 9

$$L_{cX\_eq}(t_1 \to t_2) = \frac{\left[(k_e+1)^2 - k_c^2\right]}{\left(k_e + 1 - k_c\frac{m-nD}{nD}\right)}L_c = \frac{\left[n(1-k^2)L + L_c\right]^2 - k_c^2L_c^2}{n(1-k^2)L + L_c - k_cL_c\frac{m-nD}{nD}}$$

Equation 10

$$L_{cY\_eq}(t_1 \to t_2) = \frac{\left[(k_e+1)^2 - k_c^2\right]}{\left(k_e + 1 - k_c\frac{nD}{m-nD}\right)}L_c = \frac{\left[n(1-k^2)L + L_c\right]^2 - k_c^2L_c^2}{n(1-k^2)L + L_c - k_cL_c\frac{nD}{m-nD}}$$

Where D is the duty cycle of the phase group pairing 202. In some embodiments, 1 PWM pulse drives a switching network 102 in the Y phase group (e.g., the PWM pulse 324 during the period between $t_3$ 306 and $t_4$ 308). In such instances, the voltages along each series of the equivalent circuit 250 and the equivalent inductances 262, 264 for the circuit 260 are reversed:

$$VS_X = k(mV_{in} - nV_{out}) \quad \text{Equation 11}$$

$$VS_Y = -knV_{out} \quad \text{Equation 12}$$

Equation 13

$$L_{cX\_eq}(t_3 \to t_4) = \frac{\left[(k_e+1)^2 - k_c^2\right]}{\left(k_e + 1 - k_c\frac{nD}{m-nD}\right)}L_c = \frac{\left[n(1-k^2)L + L_c\right]^2 - k_c^2L_c^2}{n(1-k^2)L + L_c - k_cL_c\frac{nD}{m-nD}}$$

Equation 14

$$L_{cX\_eq}(t_1 \to t_2) = \frac{\left[(k_e+1)^2 - k_c^2\right]}{\left(k_e + 1 - k_c\frac{m-nD}{nD}\right)}L_c = \frac{\left[n(1-k^2)L + L_c\right]^2 - k_c^2L_c^2}{n(1-k^2)L + L_c - k_cL_c\frac{m-nD}{nD}}$$

When operating in the second steady state, all PWM pulses 322-332 are low and the voltages across each series in the circuit 250 can be derived from the output voltage. For example, for the phase group X 204 and the phase group Y 206 in the phase group pairing 202, each phase group includes 3 PWMs and 1 PWM drives m phases, resulting in a total of n phases. In such instances, the voltage along each series in the circuit 250 during the period is:

$$VS_X = VS_Y = -knV_{out} \quad \text{Equation 15}$$

In such instances, the inductances for the equivalent inductors 262, 264 for the circuit 260 can be derived for the second steady state, where the equivalent inductance for each series is equal and based on the compensating coupling inductors 218, 238:

$$L_{cY\_eq}(t_2 \to t_3) = L_{cX\_eq}(t_2 \to t_3) = n(1-k^2)L + (1-k_c)L_c \quad \text{Equation 16}$$

Figure 4:
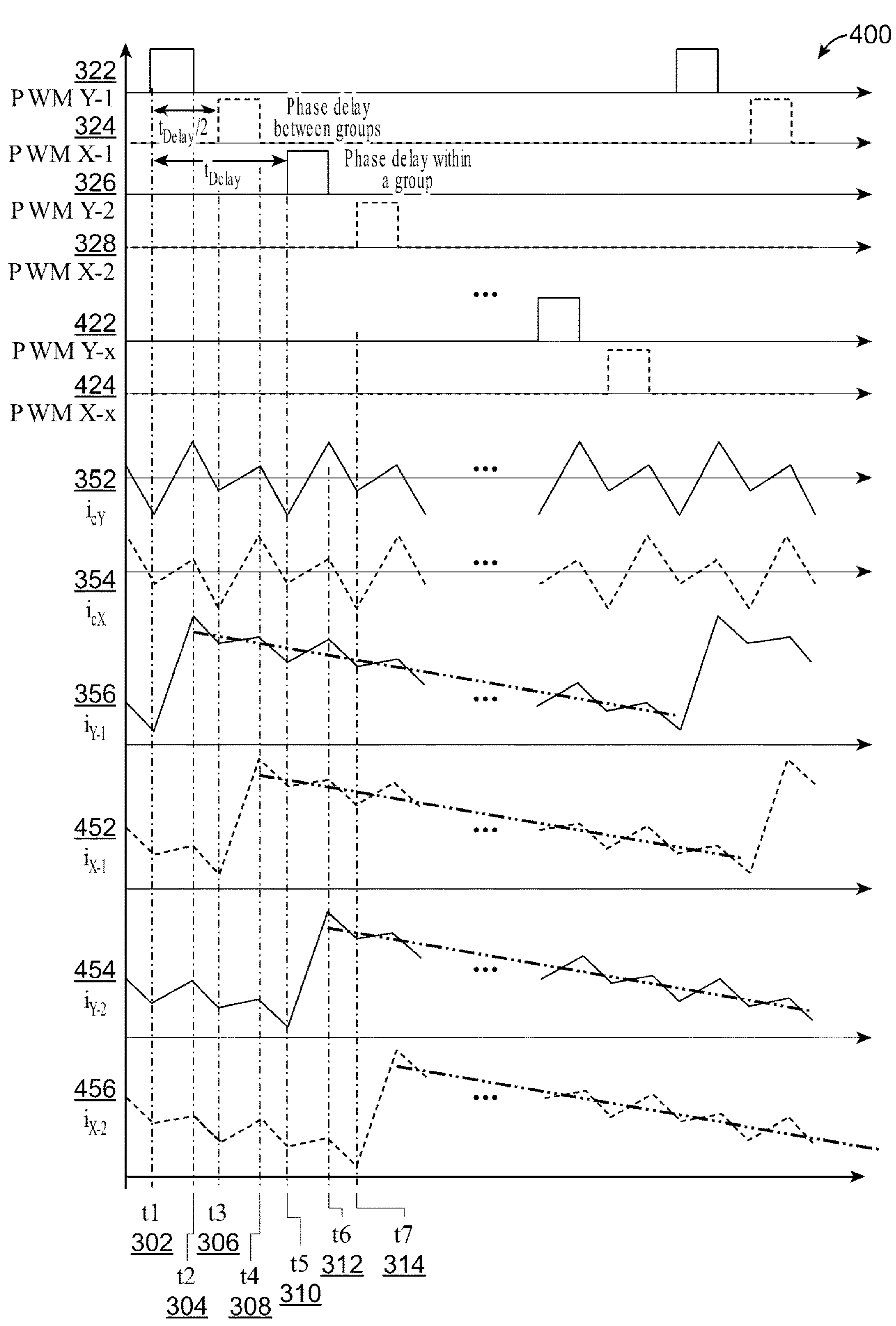
FIG. 4 illustrates additional waveforms of various components of the multiphase TLVR of FIG. 1 during operation of one or more switching networks according to one or more aspects of the present disclosure.

FIG. 4 illustrates additional waveforms 400 of various components of the multiphase TLVR of FIG. 1 during operation of one or more switching networks, according to one or more aspects of the present disclosure. As shown, the waveforms 400 include the pulse width modulation pulses 322-326, 422, 424. The waveforms 400 further include the current $i_{cX}$ 354 along the first series, and the current $i_{cY}$ 352 along the second series, and the currents across the first windings of various phase converters included in the phase group X 204 and the phase group Y 206. The currents across the first windings include the current $i_{Y\text{-}1}$ 356 across the first winding of the coupling transformer 104 in the Y-1 switching circuit, the current $i_{X\text{-}1}$ 452 across the first winding of the coupling transformer 104 in the X-1 switching circuit, the current $i_{Y\text{-}2}$ 454 across the first winding of the coupling transformer 104 in the Y-2 switching circuit, and the current $i_{X\text{-}2}$ 456 across the first winding of the coupling transformer 104 in the X-2 switching circuit.

As shown, the current the first winding of each phase converter follows a similar pattern, with the current across the first winding peaking in response to a pulse provided by a switching network 102, and slowly decreasing, with current ripples due to pulses provided by other switching networks 102 in the phase converters of the phase group pairing 202. The current $i_{cX}$ 354 of the first series 210 in the circuit 250 is based on the operations of the switching networks 102 in the X group and are based at least on the currents 452, 456 flowing through the first windings of the coupling transformers 104 of the phase group X 204. Further, due to the mutual inductance associated with the compensating coupling transformer 220, the current $i_{cX}$ 354 is also based in part on the current $i_{cY}$ 352 flowing through the series 230 of secondary windings and the compensating coupling inductor 238. Similarly, the current $i_{cY}$ 352 of the second series 230 in the circuit 250 is based on the operations of the switching circuits in the phase group Y 206 and are based at least on the currents 356, 454 flowing through the first windings of the coupling transformers 104 in the phase group Y 206. Further, due to the mutual inductance 240 associated with the compensating coupling transformer 220, the current $i_{cY}$ 352 is also based in part on the current $i_{cX}$ 354 flowing through the series of inductors 212, 214, 216, and the compensating coupling inductor 218.

As shown, the phase currents 354, 452, 454, 456 while the phase group pairing 202 operates in the steady state is based at least on the additional mutual inductance 240 associated with the compensating coupling transformer 220. As a result, the phase currents 354, 452, 454, 456 are smaller and have lower peak-to-peak values than the phase currents for phase groups that include coupling inductors that have no mutual inductance (e.g., the compensating inductors 106, 108). Consequently, that the phase group pairing 202 reduces the risk of inductance saturation by using inductors that operate with lower saturation currents, reducing the heat dissipation pressure and enabling the use of smaller heat sinks, thereby reducing product cost but improving reliability.

Figure 5:
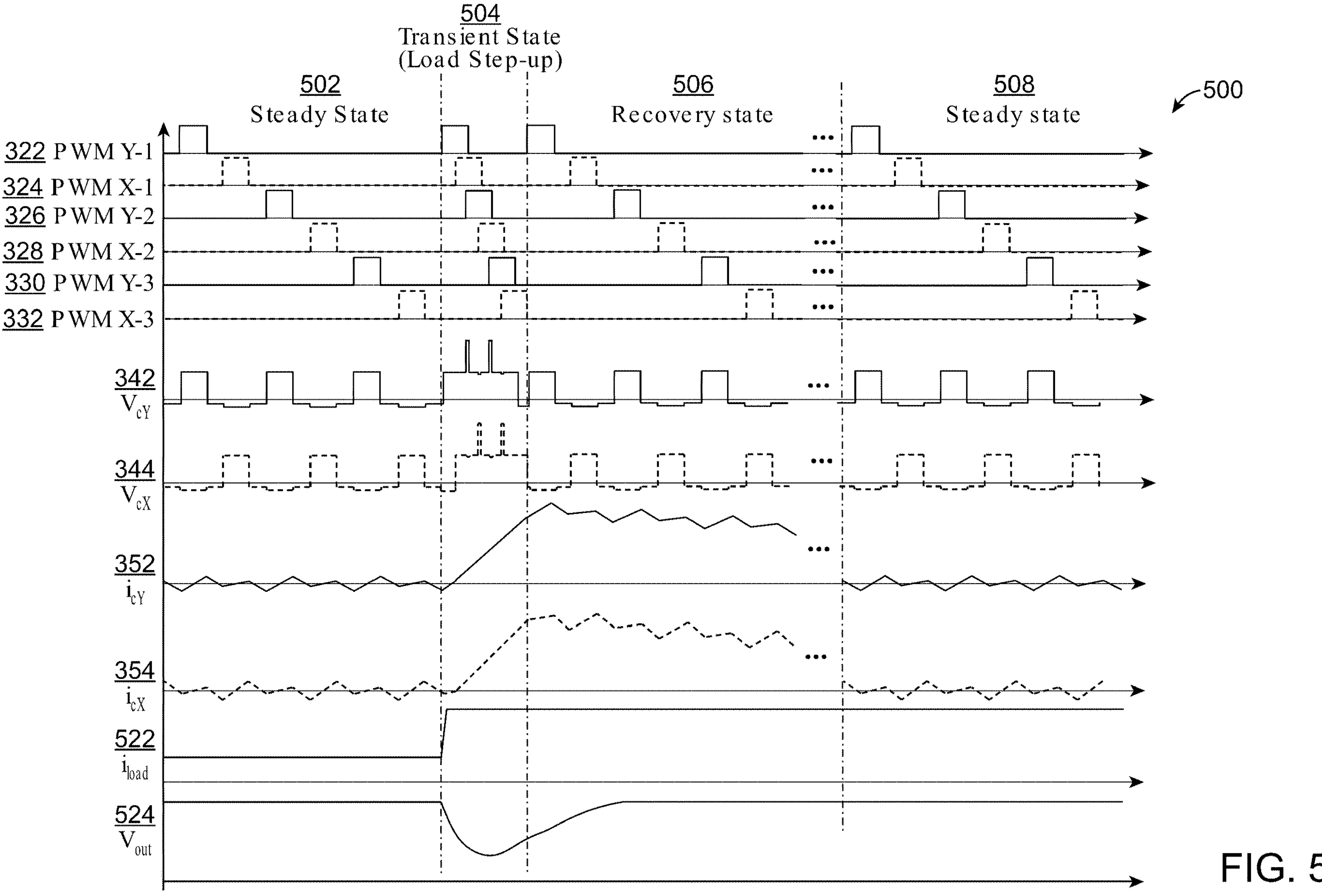
FIG. 5 illustrates waveforms of various components of the phase group pairing of FIG. 2 including a step-up operation, according to one or more aspects of the present disclosure.

FIG. 5 illustrates waveforms of various components of the phase group pairing 202 of FIG. 2 including a step-up operation, according to one or more aspects of the present disclosure. As shown, the waveforms 500 include the PWM pulses 322-332, the voltage $V_{cX}$ 344 and current $i_{cX}$ 354 along the first series 210, and the voltage $V_{cY}$ 342 and current $i_{cY}$ 352 along the second series 230, a load current $i_{load}$ 522, and an output voltage $V_{out}$ 524 provided by the phase group pairing 202.

The phase group pairing 202 initially operates in the steady state 502 then transitions to a first dynamic load (load step-up) state 504 and a recovery state 506 before returning to a steady state 508. When operating in the first dynamic load state 504, the load steps up when all PWM pulses 322-332 are almost all high. In such instances, the inductance of the equivalent inductors 262, 264 of the circuit 260 can also be derived as the inductances for the circuit 260 when operating in the second steady state, as shown by Equation 16 above. As the inductances for the equivalent inductors 262, 264 when operating in the dynamic load state 504 are similar to the inductances of the equivalent inductors 262, 264 in the second steady state, the phase group pairing 202 that uses the compensating coupling transformer 220 reduces the fluctuation of the output voltage 524, thereby increasing the efficiency of generating the output voltage 524, and reduces the output capacitance.

Figure 6:
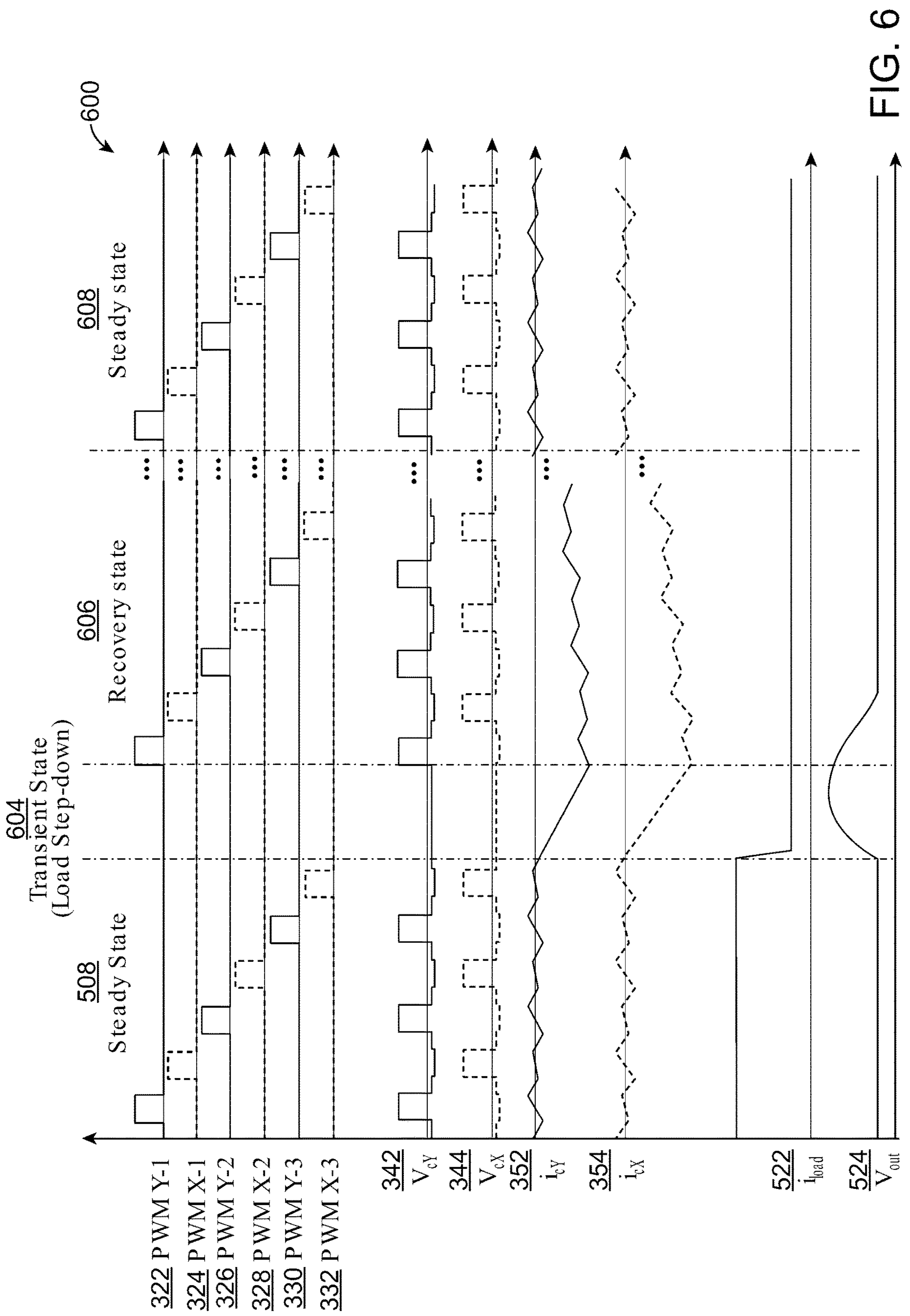
FIG. 6 illustrates waveforms of various components of the phase group pairing of FIG. 2 including a step-down operation, according to one or more aspects of the present disclosure.

FIG. 6 illustrates waveforms 600 of various components of the phase group pairing 202 of FIG. 2 including a step-down operation, according to one or more aspects of the present disclosure. As shown, the waveforms 500 include the PWM pulses 322-332, the voltage $V_{cX}$ 344 and current $i_{cX}$ 354 along the first series, and the voltage $V_{cY}$ 342 and current $i_{cY}$ 352 along the second series, a load voltage $i_{load}$ 522 and an output voltage $V_{out}$ 524 provided by the phase group pairing 202.

The phase group pairing 202 initially operates in the steady state 508 then transitions to a second dynamic load state (load step-up) 604 and a recovery state 606 before returning to a steady state 608. The phase group pairing 202 operates in a second dynamic load state, where the load steps down when all PWM pulses 322-332 are almost all low. In such instances, the inductance of the equivalent inductor 262, 264 is also equal to the equivalent of the inductance when operating in the second steady state, as shown by Equation 16 above. As the equivalent inductance when operating in a dynamic load state is similar to the equivalent inductance in the second steady state, the phase group pairing 202 that uses the compensating coupling transformer 220 reduces the fluctuation of the output voltage 524, thereby increasing the efficiency of generating the output voltage 524, and reduces the output capacitance.

Figure 7:
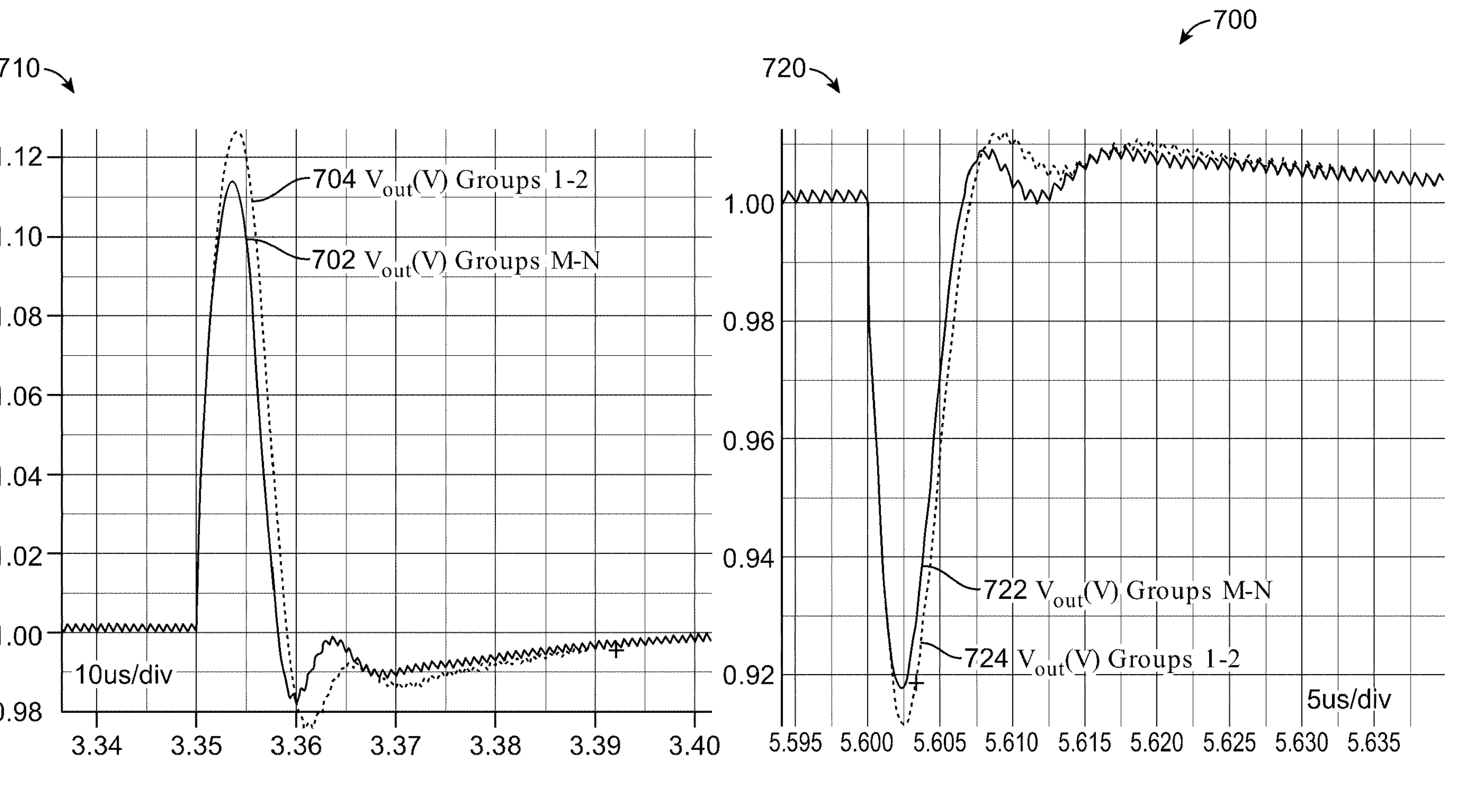
FIG. 7 is a graph illustrating the dynamic load performance of a phase group pairing of FIG. 2 including a compensating coupling transformer compared to phase groups of the TLVR of FIG. 1 that does not include a compensating coupling transformer, according to one or more aspects of the present disclosure.

FIG. 7 is a graph 700 illustrating the dynamic load performance of a phase group pairing 202 of FIG. 2 including a compensating coupling transformer 220 compared to phase groups 110, 120 of the TLVR 100 of FIG. 1 that does not include a compensating coupling transformer, according to one or more aspects of the present disclosure. As shown, the graphs 700 include a graph 710 that compares the step-down response 704 of the phase group 1 110 and the phase group 2 120 and the step-down response 702 of the phase group pairing 202. The graphs 700 also include a graph 720 that compares the step-up response 724 of the phase group 1 110 and the phase group 2 120 and the step-up response 722 of the phase group pairing 202.

As shown, the graphs 700 illustrate that the phase group pairing including the phase groups 130, 140 has better a transient performance than the phase group 110 both during load step-up and load step-down. For example, the phase group 110 generates an output voltage with a peak-to-peak value is 215.2 mV. In comparison, the phase group pairing including the phase groups 130, 140 generates an output voltage having a peak-to-peak value of 196.4 mV.

Figure 8:
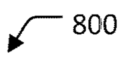
FIG. 8 sets forth a flowchart of method steps for generating output power for an electronic component, according to one or more aspects of the present disclosure.
Figure 8:
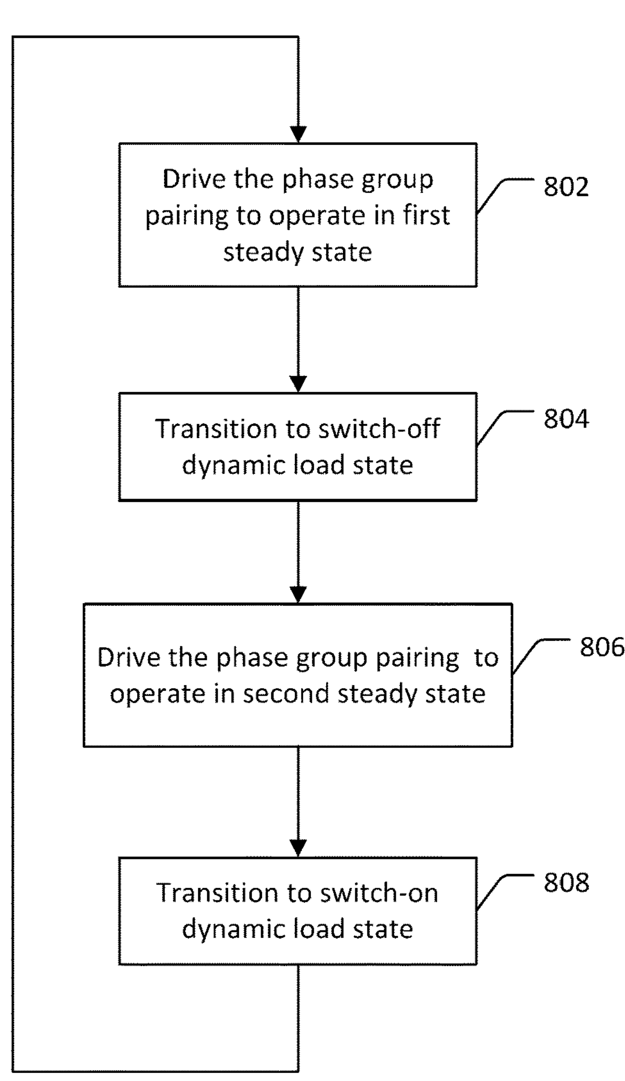

FIG. 8 sets forth a flowchart of method steps for generating output power for an electronic component, according to one or more aspects of the present disclosure. steps for sensing current in a multiphase TLVR, according to various embodiments. Although the method steps are described in conjunction with the systems of FIGS. 1-7, persons skilled in the art will understand that any system configured to perform the method steps in any order falls within the scope of the present disclosure.

As shown, the method 800 begins at step 802, where the TLVR 100 drives a phase group pairing 170 to operate in a first steady state. In various embodiments, a switching network 102 included in at least one of the phase converters 132, 136, 142, 146 drives the corresponding phase converter 132, 136, 142, 146 to operate in a first steady state. For example, the switching network of the phase 1 converter 132 included in the phase group M 130 drives coupling transformer 104 of the phase 1 converter 132. The secondary winding of the coupling transformer 104 is included in a series of secondary windings of the coupling transformers 104 included in the phase group M 130. Based on the operation of the secondary winding in the phase 1 converter 132, the phase group pairing 170 of the phase group M 130 and the phase group N 140 operate in the first steady state. When operating in the first steady state, the voltages across a circuit of secondary windings of the coupling transformers 104 (e.g., the secondary windings included in the phase group M 130) and the compensating coupling inductor 152 is based on the output voltage generated by the TLVR 100 and/or the input voltage received by the TLVR 100.

At step 804, the TLVR 100 transitions to a switch-off dynamic load state. In various embodiments, the switching networks cause the phase group pairing to operate in the first dynamic load state 504 and a recovery state 506 before returning to a steady state 508. When operating in the first dynamic load state 504, the load steps up when all PWM pulses 322-332 are almost all high. In such instances, the inductance of the circuit of secondary windings of the coupling transformers 104 (e.g., the secondary windings included in the phase group M 130) and the compensating coupling inductor 152 is equal to the inductance for the same circuit when operating in the second steady state.

At step 806, the TLVR 100 drives the phase group pairing 170 to operate in a second steady state. When operating in the second steady state, all switching networks in the phase group M 130 and the phase group N 140 are low and the voltages across the circuit of secondary windings of the coupling transformers 104 and the compensating coupling inductor 152 is based on the output voltage of the TLVR 100.

At step 808, the TLVR 100 transitions to a switch-on dynamic load state. In various embodiments, the switching networks cause the phase group paring to operate the second dynamic load state 604 and a recovery state 606 before returning to the steady state. The phase group pairing 170 operates in a second dynamic load state 604 where the load steps down when all PWM pulses 322-332 are almost all low. In such instances, the inductance of the circuit of secondary windings of the coupling inductors and the compensating coupling inductor 152 is equal to the circuit when operating in the second steady state. In various embodiments, the TLVR 100 can transition from the switch-on dynamic load state to operate in the first steady state.

Figure 9:
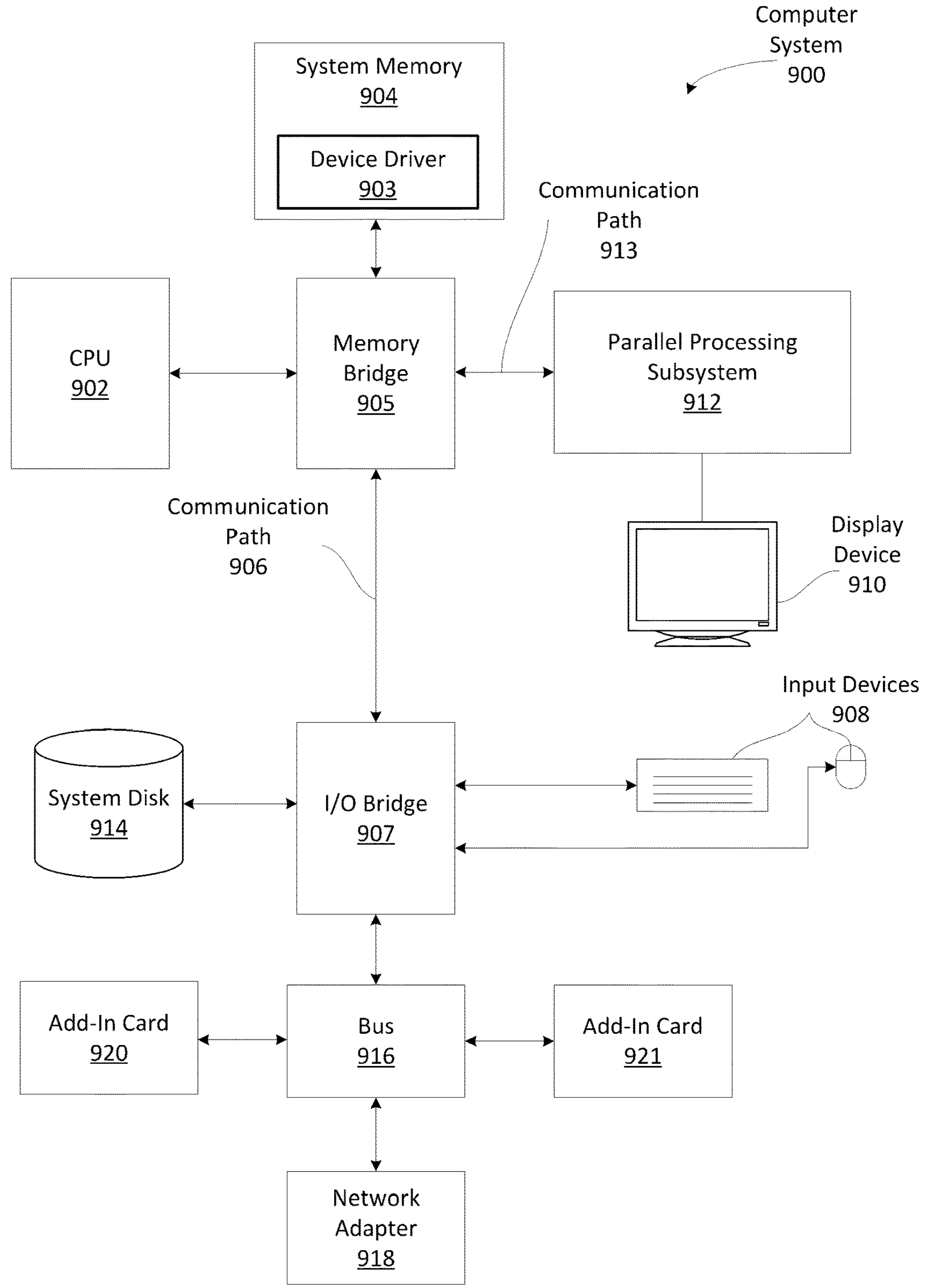
FIG. 9 illustrates a computer system configured to implement one or more aspects of the present disclosure.

FIG. 9 illustrates a computer system configured to implement one or more aspects of the present disclosure. As shown, computer system 900 includes, without limitation, a central processing unit (CPU) 902 and a system memory 904 coupled to a parallel processing subsystem 912 via a memory bridge 905 and a communication path 913. Memory bridge 905 is further coupled to an I/O (input/output) bridge 907 via a communication path 906, and I/O bridge 907 is, in turn, coupled to a bus 916.

In various embodiments, one or more components of the computer system 900 (e.g., the CPU 902, the parallel processing subsystem 912, etc.) includes one or more circuit boards that incorporate one or more of the TLVRs 100 as part of the circuitry. For example, a circuit board containing the CPU 902 can include one or more switching power circuits that include at least one TLVR 100.

In operation, I/O bridge 907 is configured to receive user input information from input devices 908, such as a keyboard or a mouse, and forward the input information to CPU 902 for processing via communication path 906 and memory bridge 905. Bus 916 is configured to provide connections between I/O bridge 907 and other components of the computer system 900, such as a network adapter 918 and various add-in cards 920 and 921.

As also shown, I/O bridge 907 is coupled to a system disk 914 that may be configured to store content and applications and data for use by CPU 902 and parallel processing subsystem 912. As a general matter, system disk 914 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid-state storage devices. Finally, although not explicitly shown, other components, such as universal serial bus or other port connections, compact disc drives, digital versatile disc drives, film recording devices, and the like, may be connected to I/O bridge 907 as well.

In various embodiments, memory bridge 905 may be a Northbridge chip, and I/O bridge 907 may be a Southbrige chip. In addition, communication paths 906 and 913, as well as other communication paths within computer system 900, may be implemented using any technically suitable protocols, including, without limitation, AGP (Accelerated Graphics Port), HyperTransport, or any other bus or point-to-point communication protocol known in the art.

In some embodiments, parallel processing subsystem 912 comprises a graphics subsystem that delivers pixels to a display device 910 that may be any conventional cathode ray tube, liquid crystal display, light-emitting diode display, or the like. In such embodiments, the parallel processing subsystem 912 incorporates circuitry optimized for graphics and video processing, including, for example, video output circuitry. As described in greater detail below in FIG. 2, such circuitry may be incorporated across one or more parallel processing units (PPUs) included within parallel processing subsystem 912. In other embodiments, the parallel processing subsystem 912 incorporates circuitry optimized for general purpose and/or compute processing. Again, such circuitry may be incorporated across one or more PPUs included within parallel processing subsystem 912 that are configured to perform such general purpose and/or compute operations. In yet other embodiments, the one or more PPUs included within parallel processing subsystem 912 may be configured to perform graphics processing, general purpose processing, and computer processing operations. System memory 904 includes at least one device driver 903 configured to manage the processing operations of the one or more PPUs within parallel processing subsystem 912. The system memory 904 also includes any number of software applications that execute on the CPU 902 and may issue commands that control the operation of the PPUs.

In various embodiments, parallel processing subsystem 912 may be integrated with one or more other the other elements of FIG. 1 to form a single system. For example, parallel processing subsystem 912 may be integrated with CPU 902 and other connection circuitry on a single chip to form a system on chip (SoC).

It will be appreciated that the system shown herein is illustrative and that variations and modifications are possible. The connection topology, including the number and arrangement of bridges, the number of CPUs 902, and the number of parallel processing subsystems 912, may be modified as desired. For example, in some embodiments, system memory 904 could be connected to CPU 902 directly rather than through memory bridge 905, and other devices would communicate with system memory 904 via memory bridge 905 and CPU 902. In other alternative topologies, parallel processing subsystem 912 may be connected to I/O bridge 907 or directly to CPU 902, rather than to memory bridge 905. In still other embodiments, I/O bridge 907 and memory bridge 905 may be integrated into a single chip instead of existing as one or more discrete devices. Lastly, in certain embodiments, one or more components shown in FIG. 7 may not be present. For example, bus 916 could be eliminated, and network adapter 918 and add-in cards 920, 921 would connect directly to I/O bridge 907.

In sum, a multiphase trans-inductor voltage regulator (TLVR) provides an output voltage to a load, such as an electronic component included in a high-performance computing system or device. The multiphase TLVR includes a phase group pairing of phase converters that produce a high-power direct output current and voltage. Each phase group in the phase group pairing includes multiple phase converters, where each phase converter includes a switching network and a coupling transformer that generates the output current at different times. The output side of each phase group is connected to a compensating coupling inductor that adjusts the inductance associated with the secondary transformers included in the phase group. The compensating coupling inductors of group pairing are primary and secondary windings of a compensating coupling transformer. In some embodiments, the compensating coupling inductors are negatively coupled. The compensating coupling transformer includes two separate self-inductances and a mutual inductance associated with the coupling between the compensating coupling inductors.

At least one technical advantage of the disclosed design for a multiphase TLVR relative to the prior art is that with the disclosed design, computer devices and systems can provide power to electronic components more efficiently and at lower costs. For example, when operating in the steady state, the inductors of the compensating coupling transformer included in the disclosed design enables a multiphase TLVR to produce output power using smaller current ripple with lower losses than what can be achieved using conventional multiphase TLVRs. When operating in dynamic load states, such as step-up or step-down transitions, the compensating coupling transformer included in the disclosed design causes a multiphase TLVR to produce a smaller transient output and recover in a shorter amount of time, thereby reducing the output capacitance relative to what is experienced with conventional multiphase TLVRs. Further, because the compensating coupling transformer included in the disclosed design occupies a smaller area on a circuit board than the two separate inductors included in conventional designs, the disclosed design enables a given printed circuit board to include a greater density of multiphase TLVRs relative to what can be achieved using conventional designs. Thus, the disclosed design improves the overall ability to control power use in high-performance computer devices and systems and when executing high-performance applications. These technical advantages provide one or more technological improvements over prior art approaches.

1. In various embodiments, a trans-inductor voltage regulator comprises a first group pairing of switching circuits that includes a first group of switching circuits, a first compensating coupling inductor coupled to the first group of switching circuits, a second group of switching circuits, and a second compensating coupling inductor coupled to the second group of switching circuits, where the first compensating coupling inductor comprises a first winding of a compensating coupling transformer, and the second compensating coupling inductor is a second winding of the compensating coupling transformer.
2. The trans-inductor voltage regulator of clause 1, where the second compensating coupling inductor is negatively coupled to the first compensating coupling inductor.
3. The trans-inductor voltage regulator of clause 1 or 2, where the second compensating coupling inductor is positively coupled to the first compensating coupling inductor.
4. The trans-inductor voltage regulator of any of clauses 1-3, where the first group of switching circuits comprises a multiphase converter that includes at least a first converter for a first phase including a first switch network and a first coupling transformer, and a second converter for a second phase including a second switch network and a second coupling transformer.
5. The trans-inductor voltage regulator of any of clauses 1-4, where the first coupling transformer includes a first primary coupling winding and a first secondary coupling winding, the second coupling transformer includes a second primary coupling winding and a second secondary coupling winding, and the first secondary coupling winding and the second secondary coupling winding are connected in series.
6. The trans-inductor voltage regulator of any of clauses 1-5, where the first compensating coupling inductor is connected in series with the first secondary winding and the second secondary winding.
7. The trans-inductor voltage regulator of any of clauses 1-6, further comprising a feedback network that, in operation, receives an output from the first group paring of switching circuits and generates a feedback signal that is transmitted to the first group of switching circuits and the second group of switching circuits.
8. The trans-inductor voltage regulator of any of clauses 1-7, where the compensating coupling transformer has a self-inductance in a range of 350-450 nH and a coupling coefficient in a range of 0.4-0.6.

9. The trans-inductor voltage regulator of any of clauses 1-8, further comprising a second group pairing of switching circuits comprising a third group of switching circuits, a third compensating coupling inductor coupled to the third group of switching circuits, a fourth group of switching circuits, and a fourth compensating coupling inductor coupled to the fourth group of switching circuits, where the third compensating coupling inductor comprises a first winding of a second compensating coupling transformer and the fourth compensating coupling inductor comprises a second winding of the second compensating coupling transformer.

10. The trans-inductor voltage regulator of any of clauses 1-9, where the fourth compensating coupling inductor is negatively coupled to the third compensating coupling inductor.

11. The trans-inductor voltage regulator of any of clauses 1-10, where the first group pairing of switching circuits includes a first quantity of phases, the second group pairing of switching circuits includes a second quantity of phases, and the first quantity of phases is different than the second quantity of phases.

12. The trans-inductor voltage regulator of any of clauses 1-11, further comprising a third group of switching circuits, a first compensating inductor connected to the third group of switching circuits, a fourth group of switching circuits, and a second compensating inductor connected to the fourth group of switching circuits.

13. In various embodiments, a system comprises a first processor, and a first trans-inductor voltage regulator that generates a first voltage to the first processor, the first trans-inductor voltage regulator comprising a first group pairing of switching circuits that includes a first group of switching circuits, a first compensating coupling inductor coupled to the first group of switching circuits, a second group of switching circuits, and a second compensating coupling inductor coupled to the second group of switching circuits, where the first compensating coupling inductor comprises a first winding of a compensating coupling transformer, and the second compensating coupling inductor comprises a second winding of the compensating coupling transformer.

14. The system of clause 13, where the second compensating coupling inductor is negatively coupled to the first compensating coupling inductor.

15. The system of clause 13 or 14, where the second compensating coupling inductor is positively coupled to the first compensating coupling inductor.

16. The system of any of clauses 13-15, further comprising a second trans-inductor voltage regulator that generates a second voltage to a semiconductor different than the first processor, the second trans-inductor voltage regulator comprising a second group pairing of switching circuits comprising a third group of switching circuits, a third compensating coupling inductor coupled to the third group of switching circuits, a fourth group of switching circuits, and a fourth compensating coupling inductor coupled to the third group of switching circuits, where the third compensating coupling inductor is a first winding of a second compensating coupling transformer, and the fourth compensating coupling inductor is a second winding of the second compensating coupling transformer.

17. The system of any of clauses 13-16, where the fourth compensating coupling inductor is negatively coupled to the third compensating coupling inductor.

18. The system of any of clauses 13-17, where the semiconductor comprises one of a central processing unit (CPU), a graphics processing unit (GPU), or an application-specific integrated circuit (ASIC).

19. The system of any of clauses 13-18, further comprising a first converter for a first phase including a first switch network and a first coupling transformer having a first primary coupling winding and a first secondary coupling winding, and a second converter for a second phase including a second switch network and a second coupling transformer having a second primary coupling winding and a second secondary coupling winding, where the first secondary coupling winding and the second secondary coupling winding are connected in series.

20. The system of any of clauses 13-19, where the first compensating coupling inductor is connected in series with the first secondary winding and the second secondary winding.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system or method. Any hardware technique, process, function, component, engine, module, or system described in the present disclosure may be implemented as a circuit or set of circuits.

Aspects of the present disclosure are described above with reference to flowchart illustrations and/or block diagrams of methods, and apparatus (systems) according to embodiments of the disclosure. It will be understood that each block of the flowchart illustrations and/or block diagrams, and combinations of blocks in the flowchart illustrations and/or block diagrams, can be implemented by portions of the system. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts.

While the preceding is directed to embodiments of the present disclosure, other and further embodiments of the disclosure may be devised without departing from the basic scope thereof, and the scope thereof is determined by the claims that follow.

What is claimed is:

1. A trans-inductor voltage regulator comprising:

a first group pairing of switching circuits that includes:

a first group of switching circuits;

a first compensating coupling inductor coupled to the first group of switching circuits;

a second group of switching circuits; and a second compensating coupling inductor coupled to the second group of switching circuits, wherein the first compensating coupling inductor comprises a first winding of a compensating coupling transformer, and the second compensating coupling inductor is a second winding of the compensating coupling transformer.

2. The trans-inductor voltage regulator of claim 1, wherein the second compensating coupling inductor is negatively coupled to the first compensating coupling inductor.

3. The trans-inductor voltage regulator of claim 1, wherein the second compensating coupling inductor is positively coupled to the first compensating coupling inductor.

4. The trans-inductor voltage regulator of claim 1, wherein the first group of switching circuits comprises a multiphase converter that includes at least:

a first converter for a first phase including a first switch network and a first coupling transformer; and a second converter for a second phase including a second switch network and a second coupling transformer.

5. The trans-inductor voltage regulator of claim 4, wherein:

the first coupling transformer includes a first primary coupling winding and a first secondary coupling winding, the second coupling transformer includes a second primary coupling winding and a second secondary coupling winding, and the first secondary coupling winding and the second secondary coupling winding are connected in series.

6. The trans-inductor voltage regulator of claim 4, wherein the first compensating coupling inductor is connected in series with the first secondary winding and the second secondary winding.

7. The trans-inductor voltage regulator of claim 1, further comprising a feedback network that, in operation, receives an output from the first group paring of switching circuits and generates a feedback signal that is transmitted to the first group of switching circuits and the second group of switching circuits.

8. The trans-inductor voltage regulator of claim 1, wherein the compensating coupling transformer has a self-inductance in a range of 350-450 nH and a coupling coefficient in a range of 0.4-0.6.

9. The trans-inductor voltage regulator of claim 1, further comprising:

a second group pairing of switching circuits comprising:

a third group of switching circuits;

a third compensating coupling inductor coupled to the third group of switching circuits;

a fourth group of switching circuits; and a fourth compensating coupling inductor coupled to the fourth group of switching circuits, wherein the third compensating coupling inductor comprises a first winding of a second compensating coupling transformer and the fourth compensating coupling inductor comprises a second winding of the second compensating coupling transformer.

10. The trans-inductor voltage regulator of claim 9, wherein the fourth compensating coupling inductor is negatively coupled to the third compensating coupling inductor.

11. The trans-inductor voltage regulator of claim 9, wherein:

the first group pairing of switching circuits includes a first quantity of phases, the second group pairing of switching circuits includes a second quantity of phases, and the first quantity of phases is different than the second quantity of phases.

12. The trans-inductor voltage regulator of claim 1, further comprising:

a third group of switching circuits;

a first compensating inductor connected to the third group of switching circuits;

a fourth group of switching circuits; and a second compensating inductor connected to the fourth group of switching circuits.

13. A system comprising:

a first processor; and a first trans-inductor voltage regulator that generates a first voltage to the first processor, the first trans-inductor voltage regulator comprising:

a first group pairing of switching circuits that includes:

a first group of switching circuits, a first compensating coupling inductor coupled to the first group of switching circuits, a second group of switching circuits, and a second compensating coupling inductor coupled to the second group of switching circuits, wherein the first compensating coupling inductor comprises a first winding of a compensating coupling transformer, and the second compensating coupling inductor comprises a second winding of the compensating coupling transformer.

14. The system of claim 13, wherein the second compensating coupling inductor is negatively coupled to the first compensating coupling inductor.

15. The system of claim 13, wherein the second compensating coupling inductor is positively coupled to the first compensating coupling inductor.

16. The system of claim 13, further comprising:

a second trans-inductor voltage regulator that generates a second voltage to a semiconductor different than the first processor, the second trans-inductor voltage regulator comprising:

a second group pairing of switching circuits comprising:

a third group of switching circuits;

a third compensating coupling inductor coupled to the third group of switching circuits;

a fourth group of switching circuits; and a fourth compensating coupling inductor coupled to the third group of switching circuits, wherein the third compensating coupling inductor is a first winding of a second compensating coupling transformer, and the fourth compensating coupling inductor is a second winding of the second compensating coupling transformer.

17. The system of claim 16, wherein the fourth compensating coupling inductor is negatively coupled to the third compensating coupling inductor.

18. The system of claim 16, wherein the semiconductor comprises one of a central processing unit (CPU), a graphics processing unit (GPU), or an application-specific integrated circuit (ASIC).

19. The system of claim 13, further comprising:

a first converter for a first phase including a first switch network and a first coupling transformer having a first primary coupling winding and a first secondary coupling winding; and a second converter for a second phase including a second switch network and a second coupling transformer having a second primary coupling winding and a second secondary coupling winding, wherein the first secondary coupling winding and the second secondary coupling winding are connected in series.

20. The system of claim 13, wherein the first compensating coupling inductor is connected in series with the first secondary winding and the second secondary winding.

* * * * *